April 11, 1961   J. B. GODSHALK ET AL   2,979,650
TEMPERATURE RESPONSIVE BATTERY SERVICING APPARATUS
Filed Aug. 25, 1960   4 Sheets-Sheet 1
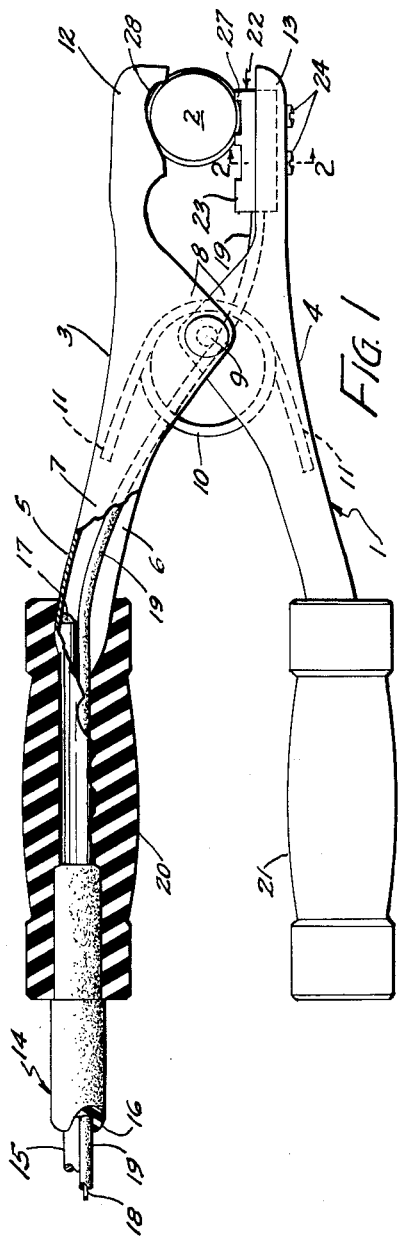
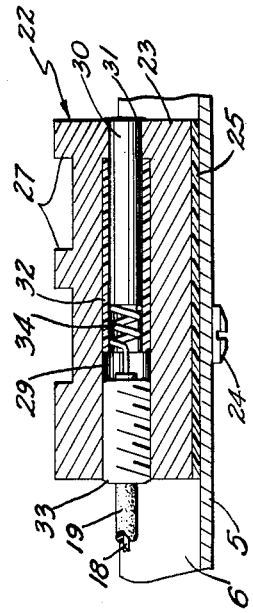
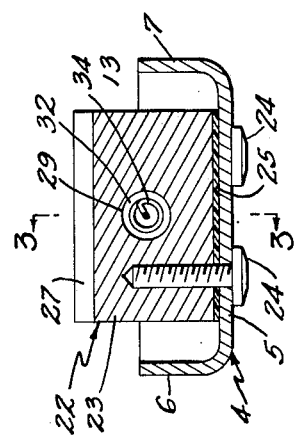
INVENTORS
JAMES B. GODSHALK
LEWIS A. MEDLAR
BY
ATTORNEY April 11, 1961   J. B. GODSHALK ET AL   2,979,650
TEMPERATURE RESPONSIVE BATTERY SERVICING APPARATUS
Filed Aug. 25, 1960   4 Sheets-Sheet 2

INVENTORS
JAMES B. GODSHALK
LEWIS A. MEDLAR
BY D.C.Roylance
ATTORNEY

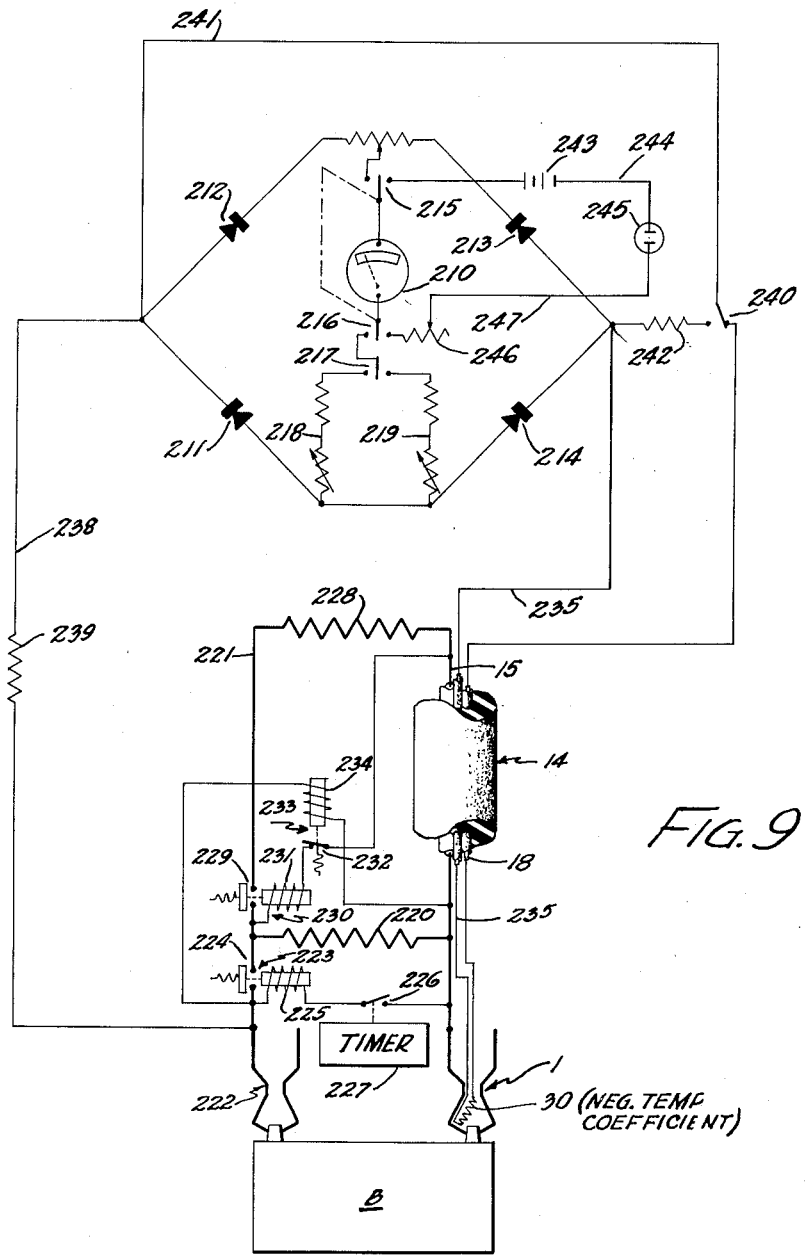

United States Patent Office 2,979,650
Patented Apr. 11, 1961

2,979,650

TEMPERATURE RESPONSIVE BATTERY SERVICING APPARATUS

James B. Godshalk, West Pikeland Township, Chester County, and Lewis A. Medlar, Oreland, Pa., assignors to Fox Products Company, Philadelphia, Pa., a corporation of Pennsylvania Filed Aug. 25, 1960, Ser. No. 51,856

4 Claims. (Cl. 320—35)

This invention relates to apparatus for electrically servicing storage batteries and more particularly to battery chargers, battery testers and like devices which are controlled automatically in accordance with the temperature of the battery being serviced.

It is now common practice to accomplish automatic control of battery chargers by directly detecting the temperature of the electrolyte by a temperature responsive device, such as a thermostat or a thermally responsive impedance, inserted in the battery via one of the filling openings. While this prior-art practice has numerous advantages and has achieved considerable commercial success, direct sensing of the electrolyte temperature presents several difficulties. Thus, since the electrolyte temperature is sensed directly, the temperature responsive unit must be so constructed as to survive periodic immersion in acid over a relatively long period. Next, special precautions must be taken to assure that the operator, who is frequently a person having relatively little skill and familiarity with technical equipment, actually inserts the temperature responsive unit in the battery, and into proper contact with the electrolyte, before operating the charger. Still another disadvantage arises because of the necessity for a special lead cable for the thermally responsive unit, such cable being separate from the charging cables and therefore requiring additional effort on the part of the operator in preparing the charger for use or for storage.

It is a general object of the invention to provide battery chargers, battery testers and other storage battery servicing apparatus with improved temperature responsive control means overcoming the foregoing disadvantages.

Another object is to devise an improved thermally responsive control unit for battery servicing equipment, which unit is brought properly into play, when the equipment is connected to the storage battery to be serviced, without requiring the operator to do more than properly connect the equipment to the terminals of the battery.

In order that the manner in which these and other objects are attained, in accordance with the invention, can be understood in detail, reference is had to the accompanying drawings, which form a part of this specification, and wherein:

Fig. 1 is an elevational view, with some parts broken away for clarity, of a battery terminal clamp constructed in accordance with the invention;

Fig. 2 is a sectional view taken on line 2—2, Fig. 1;

Fig. 3 is a sectional view taken on line 3—3, Fig. 2, Figs. 2 and 3 being enlarged in scale for clarity;

Fig. 9 is a schematic diagram of a battery tester constructed in accordance with the invention.

Figure 4:
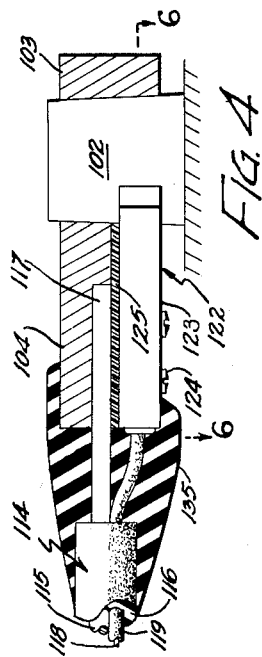
Fig. 4 is a view, partly in vertical section and partly in side elevation, illustrating another battery terminal connector constructed in accordance with the invention.

The invention is based in part upon the discovery that proper automatic control of battery chargers, battery testers and the like in accordance with the temperature of the battery electrolyte can be accomplished by making the automatic control means responsive to the temperature of a terminal post of the battery rather than directly to the temperature of the electrolyte. In accordance with the invention, the temperature of a terminal post of the battery to be charged, tested or otherwise serviced is sensed by means of a thermally responsive element carried by a carrier member having good heat conducting characteristics, the carrier member being maintained in direct contact with the terminal post by the action of the connector member attached to the terminal post for connecting the charger, tester or the like electrically to the battery.

Turning now to the drawings in detail, it will be seen that Figs. 1–3 illustrate a connector, indicated generally at 1, of the pivoted jaw type designated for clamping engagement with the terminal post 2 of a conventional storage battery. The connector 1 comprises two members 3 and 4 fabricated from relatively rigid sheet metal by stamping or like procedures, each of the members 3, 4 being of generally U-shape transverse cross-section throughout their length, so as to have a bottom wall 5 and spaced side walls 6 and 7. At intermediate points, the side walls of the members 3 and 4 are provided with enlarged portions, as indicated at 8, and the two members 3 and 4 are pivoted together by means of a pivot pin 9 which extends through portions 8 and has an enlarged head at each end to retain members 3 and 4 in assembled relation. A torsion spring 10 encircles pin 9 and has its ends 11 extended to engage the inner surfaces of bottom walls 5 of members 3, 4, so that the torsion spring is effective to bias the jaw portions 12 and 13 of members 3 and 4, respectively, toward each other.

A flexible insulated electrical cable, indicated generally at 14, leads to the handle end of member 3, that is, to the end of that member opposite jaw portion 12. Cable 14 includes a centrally disposed heavy copper conductor 15 and an insulating sheath 16 of rubber or the like, conductor 15 having an exposed tip 17 embraced by and soldered or otherwise mechanically and electrically connected to the handle end of member 3. Cable 14 also includes a second, smaller conductor 18 having an insulating sheath 19, conductor 18 extending along beside conductor 15 and projecting beyond the tip 17 thereof and toward jaw portion 13 of member 4. An insulating handle member 20 embraces the handle end of member 3. An identical insulating handle member 21 embraces the handle end of member 4.

Jaw portion 13 of member 4 carries a thermally responsive unit indicated generally at 22. Unit 22 includes a block 23 which is fabricated from brass, bronze or equivalent rigid, electrically conductive material having good heat-conducting characteristics. Block 23 is of rectangular transverse cross-section and also of rectangular longitudinal cross-section, being elongated in the direction of the length of connector 1. Block 23 is rigidly secured to the bottom wall 5 of handle member 4, as by screws 24 of nylon or like material having poor heat-conducting characteristics. A relatively thin sheet 25 of polyvinyl resinous material effective as good thermal and electrical insulation is interposed between block 23 and wall 5 of member 4.

On its face opposite wall 5 of member 4, block 23 is provided with a pair of transversely extending, longitudinally spaced, parallel projections 27 so dimensioned and located as to engage the side surface of terminal post 2, as seen in Fig. 1. In a location opposite projection 27, the side walls 6 and 7 of jaw portion 12 of member 3 have matching concave edge portions 28. Accordingly, it will be seen that the effect of torsion spring 10 is to clamp the terminal post 2 between block 23, carried by member 4, and edge portions 28 of the side walls of member 3.

Extending lonigtudinally completely through block 23 is a bore 29. Bore 29 has a portion of larger diameter, extending for almost the entire length of the block toward the handle end of members 3 and 4, and also includes a portion of smaller diameter opening at the end of the block opposite the handle portion. As best seen in Fig. 3, a thermally responsive impedance 30, cylindrical in shape, has one end seated in the portion of bore 29 of smaller diameter. The diameter of impedance 30 matches the diameter of the smaller portion of bore 29, so that the end of the impedance is firmly engaged in the bore. This end of impedance 30 is securely attached to block 23 and electrically connected thereto by means of a solder joint, indicated at 31, the solder joint being effective also to close bore 29 at this point. The impedance 30 lies mainly within the portion of bore 29 which is of larger diameter. For most of the length of impedance 30, there is a substantial annular space between the wall of bore 29 and the impedance, and this space is filled by a cylindrical sleeve of insulating material 32, one end of sleeve 32 extending well beyond the inner end of the impedance.

The end of bore 29 opposite solder joint 31 is internally threaded and receives an externally threaded insulating bushing 33 of fiber or other suitable relatively rigid material. The free tip of insulating sheath 19 of conductor 18 extends completely through bushing 33 and is rigidly secured therein. Conductor 18 projects beyond bushing 33 and has its free tip formed into a helical resilient portion 34 disposed in sleeve 32 and engaging the free tip of impedance 30, as seen in Fig. 3.

The action of connector 1 is such as to force block 23 into firm engagement with terminal post 2, so that excellent heat transfer between terminal post 2 and block 23 can be attained. Since the tip of impedance 30 is in direct engagement with and is soldered to block 23, and since block 23 is of material having good heat-conducting characteristics, it will be understood that good transfer of heat from terminal post 2 to impedance 30 is accomplished. On the other hand, insulating sheet 25 and nylon screws 24 are effective to minimize heat transfer from member 4 to block 23 and therefore from member 4 to impedance 30.

As will be explained in more detail hereinafter, the battery servicing equipment with which the device of Figs. 1–3 is employed is connected electrically to terminal post 2 of the battery via conductor 15 and connector member 3. Servicing equipment such as battery chargers, battery testers of the load type, battery heaters and the like are of such nature that the current flow through conductor 15 and member 3 may be of considerable magnitude and member 3 may accordingly be resistively heated to a material extent. Such current flow in member 4, however, is not present. This is because member 4 is not connected electrically to terminal post 2. It is obvious that all of the current carried by main conductor 15 will flow directly through member 3 and that none of such current will flow through member 4. Hence, the effect of resistive heating in the connector is concentrated in member 3, which member is thermally isolated from block 23 and impedance 30. Accordingly, the temperature imparted to impedance 30 is substantially that which is derived from terminal post 2.

Conductor 18 is employed to connect impedance 30 to the thermal control circuit of the battery charger, battery tester or other battery servicing equipment with which the clamp 1 is employed. As will be described in greater detail hereinafter, connection of the impedance into the control circuit involves the electrical path including impedance 30, solder joint 31, block 23 and terminal post 2.

While certain distinct advantages are attained when the invention is applied to a pivoted jaw connector clamp of the type just described with reference to Figs. 1–3, the invention is also applicable to so-called ring connectors, as will now be explained in connection with Figs. 4–6. Here, the ring connector is indicated generally at 101 in association with a storage battery terminal post 102. The connector 101 includes a main metallic body 103 having an opening of such size and shape as to snugly embrace the terminal post 102, as shown. Body 103 also includes an integral extension 104 which is of reduced thickness in comparison with the main portion of body 103 and which is grooved, in a direction radial with respect to post 102, to receive the tip 117 of main conductor 115 of an insulated electrical cable 114. Cable 114 also includes a secondary conductor 118 extending along beside conductor 115 and isolated by an insulating sheath indicated at 119.

Securely attached to that face of portion 104 of connector body 103 which is directed toward the storage battery when in use is a thermally responsive unit 122. Unit 122 includes a block 123 of brass, bronze or other metal of good heat-conducting capacity, block 123 being generally of rectangular transverse cross-section and having a plan shape matching that of portion 104 of body 103. Block 123 is rigidly attached to portion 104, as by means of nylon screws 124, Figs. 4 and 6, a heat-insulating sheet 125 being interposed between portion 104 and block 123, as seen in Fig. 4. Sheet 125, which may be of polyvinyl resinous materal or the like, is not only effective to minimize heat transfer from body 103 to the thermally responsive unit 122 but also serves to close the groove within which tip portion 117 of conductor 115 is soldered.

Figure 6:
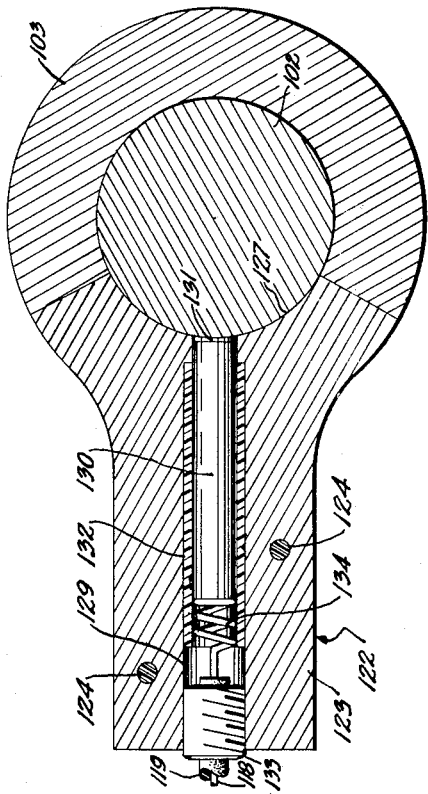
Fig. 6 is a sectional view, enlarged for clarity, taken on line 6—6, Fig. 4.

The end of block 123 adjacent the opening in body 103 to accommodate terminal post 102 is enlarged and provided with a cylindrical or frusto-conical end surface, seen at 127 in Fig. 6, of such dimensions and so disposed as to be brought into uniform face-to-face engagement with the side surface of the terminal post 102 when the connector is in use. Block 123 is provided with a through-bore 129 extending radially with respect to the opening which accommodates terminal post 102. Adjacent face 127, bore 129 includes a portion of smaller diameter which firmly embraces the tip of a cylindrical thermally responsive impedance 130. The end of the smaller portion of bore 129 is closed by solder, indicated at 131, Fig. 6, serving to electrically and mechanically interconnect the impedance 130 and block 123. The solder at 131 also functions as a continuation of surface 127.

Within bore 129, the impedance 130 is completely enclosed by a cylindrical insulating sleeve 132, the end of sleeve 132 opposite the solder joint at 131 being extended beyond the corresponding end of the impedance. The end of bore 129 opposite the solder joint at 131 is interiorly threaded and receives an exteriorly threaded insulating bushing 133. The tip of insulating sheath 119 extends completely through bushing 133 into bore 129. Conductor 118 extends further into bore 129 and has its tip formed in helical fashion within sleeve 132 so as to provide a resilient portion 134 engaged with the adjacent end of impedance 130.

Figure 5:
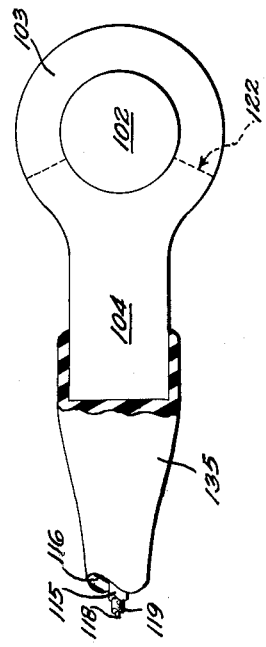
Fig. 5 is a top plan view of the device of Fig. 1 with some parts broken away for clarity.

Cable 114 includes an outer insulating sheath 116 terminating short of body 123, as will be clear from Fig. 4. The tip of sheath 116 is connected to body 123 by a molded rubber joint indicated at 135, Fig. 4.

It will be understood that, when the connector is in use, the main current flow between the battery and the electrical apparatus of which the connector forms a part is via the relatively heavy conductor 115 and body 103 of the connector. This current path is electrically isolated from the thermally responsive unit 122 and the latter is thermally isolated from body 103 by sheet 125 and insulating screws 124. On the other hand, since body 123 has an extensive face 127 maintained in direct engagement with the terminal post 102, it will be seen that the primary heat transfer to the thermally responsive unit is directly from the terminal post. As will be later explained, the thermally responsive impedance 130 is connected to the control circuit of the servicing equipment via conductor 118, solder joint 131, body 123 and terminal post 102.

While it must be recognized that the temperature of a battery terminal post differs from that of the electrolyte in the battery, and while the temperature of metal block 23, Fig. 1, and metal block 123, Fig. 4, is necessarily different from that of the terminal post to which the connector is attached, we have found that, with connectors constructed in accordance with the invention, the temperature of the impedance 30, 130 bears a dependable relationship to the battery electrolyte temperature. With proper choice of circuit parameters in the control circuit to which the impedance 30, 130 is connected, operation of the control circuit is, for practical purposes, the same as if the impedance were subjected directly to the electrolyte temperature.

Figure 7:
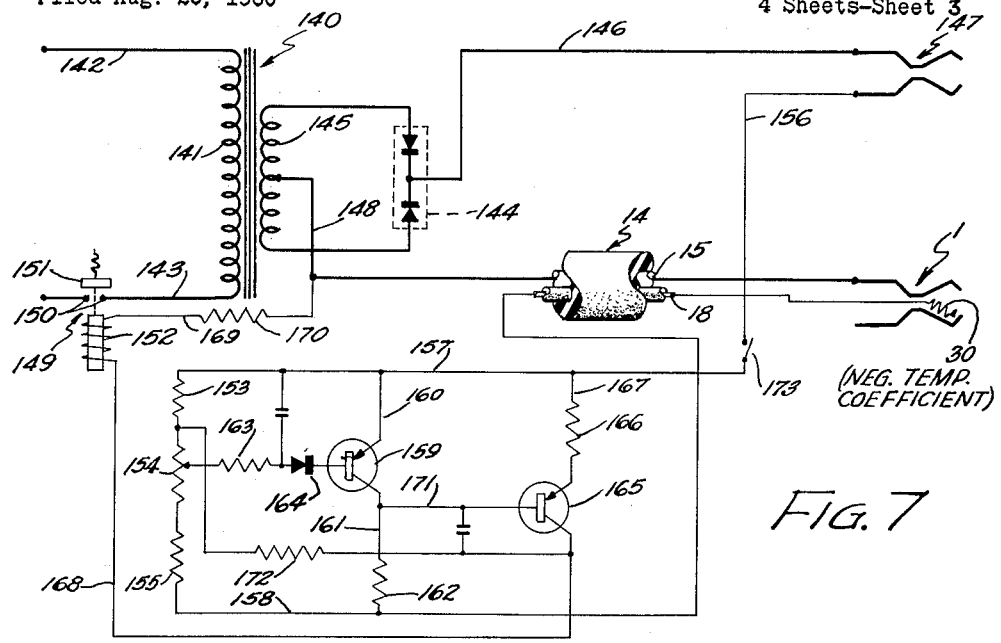
Figs. 7 and 8 are schematic diagrams of battery chargers in accordance with the invention.

A battery charger constructed in accordance with one particularly advantageous embodiment of the invention is illustrated in Fig. 7. The charger includes a transformer 140 having a primary winding 141 connected to a suitable alternating current source (not shown) via conductors 142, 143. A center-tapped rectifier 144 is connected across secondary winding 145 of the transformer, the center-tap of the rectifier being connected via conductor 146 to a connector clamp 147 for engagement with one terminal post of the battery (not shown) to be charged. The center-tap of secondary winding 145 is connected via conductor 148 and main conductor 15 of cable 14 to a connector clamp constructed as hereinbefore described with reference to Figs. 1-3, such clamp being shown schematically at 1 in Fig. 7 and of course including the thermally responsive impedance 30. In this case, impedance 30 is a resistor having a negative temperature coefficient of resistance.

The charging circuit is controlled in on-off fashion, in accordance with the terminal voltage of the battery being charged, by a normally open relay 149 having fixed contacts 150 interposed in conductor 143, a spring biased movable contact 151 and an actuating winding 152, operation of relay 149 being controlled by a control circuit which will now be described.

The control circuit includes a voltage divider comprising resistances 153—155 connected in series, the voltage divider being connected across the battery via conductors 156 and 157, leading to connector clamp 147, and conductor 158 and auxiliary conductor 18. Thus, temperature responsive impedance 30, mechanically carried by connector clamp 1, is arranged in series, as part of the voltage divider, between the battery terminal post to which clamp 1 is connected and resistance 155. A first transistor 159, of the PNP type, has its emitter connected to conductor 157 by conductor 160 and its collector connected to conductor 158 via conductor 161 and resistance 162. The series combination of a resistance 163 and a Zener diode 164 is connected between the output terminal of the voltage divider and the base of transistor 159. A second PNP type transistor 165 is employed, the emitter thereof being connected to conductor 157 via resistance 166 and conductor 167. The collector of transistor 165 is connected by conductor 168 to one terminal of winding 152 of relay 149, the other terminal of winding 152 being connected to conductor 148 via conductor 169 and resistance 170. It is thus seen that the actuating winding of the relay is connected to the output of rectifier 144 and similarly across the battery to which the charger is connected, via transistor 165.

By conductor 171, the base of transistor 165 is connected directly to the collector of transistor 159. A resistance 172 is connected between the collector of transistor 165 and a point on the voltage divider between resistances 153 and 154, forming a positive feedback circuit. A manual or other suitable switch 173 is inserted in conductor 156. The voltage divider comprising resistances 153—155 and thermally responsive resistance 30 is effective to derive from the battery being charged a voltage, the magnitude of which is related both to the terminal voltage of the battery and to the battery temperature, as sensed by resistance 30. This voltage is applied to the Zener diode 164. The Zener diode is so poled as to receive current from the battery only in the inverse (high resistance) direction. Thus, the voltage applied to the Zener diode 164 will be inadequate to cause the diode to conduct so long as the terminal voltage of the battery, as compensated for temperature by resistance 30, is below a predetermined value to which the control circuit is to respond.

Assuming that switch 173 is closed and that the voltage derived from the voltage divider and applied to the Zener diode is below the predetermined value, transistor 159 is fully nonconductive and transistor 165 is fully conductive. Since transistor 165 conducts, control current flows through winding 152 of relay 149, the relay is energized, and contacts 150, 151 are engaged so that current is supplied from the A.C. source to the primary winding of the transformer. As charging proceeds, and the terminal voltage of the battery increases (assuming that the temperature of the battery is not unusually low) the voltage derived from the voltage divider and applied to the Zener diode increases until it reaches the predetermined critical value. Diode 164 then becomes conductive. At the instant the diode becomes conductive, the current therethrough is just sufficient to make transistor 159 conductive.

The value of resistance 162 is so selected that the potential at the base of transistor 165 is at the edge of the saturation for that transistor. Hence, a slight flow of current through transistor 159 causes the emitter-to-base potential of transistor 165 to decrease, resulting in a decrease in conductivity of transistor 165.

The positive feedback circuit provided through resistance 172 is such that, as transistor 165 becomes less conductive, less current flows through resistance 172 and a greater voltage is accordingly applied from the voltage divider to Zener diode 164. The emitter-to-collector current of transistor 159 therefore increases still further, resulting in a further decrease in the potential at the base of transistor 165. Transistor 165 is thus positively caused to become completely nonconductive and all current flow in winding 152 of relay 149 therefore ceases and movable contact 151 returns under its spring bias to its normally open position, interrupting the flow of current to primary winding 141 of the transformer so that charging is terminated.

As to the operation of the control circuit, the effect of the thermally responsive impedance 30 is to increase the cutoff voltage, that is, the critical value of the battery terminal voltage at which relay 149 will be caused to open, when the battery temperature is unusually low. It will be understood that a battery charger of the type illustrated in Fig. 7 depends for its operation on the assumption that, as a result of charging, the battery will "come up to voltage" within the time period of charging contemplated. Were all batteries to be charged at a more or less standard temperature, then it would be acceptable to have the control circuit of Fig. 7 operate to open relay 149 upon occurrence of a single terminal voltage for all batteries. However, the proper cutoff voltage for storage batteries has been found to increase with decreasing battery temperatures. Thus, to assure attainment of a charge which can be considered as "full charge" for practical purposes, a cutoff voltage on the order of 16 volts, for example, may be proper in the case of charging a 12 volt battery which is at 80° F., while a cutoff voltage on the order of 17 to 20 volts, for example, may be proper for a 12 volt battery at 30° F. The effect of thermally responsive resistance 30 is to compensate the control circuit of Fig. 7 in such fashion that ranges of cutoff voltages can be properly attained in accordance with the variations in temperature of the batteries to be charged.

Figure 8:
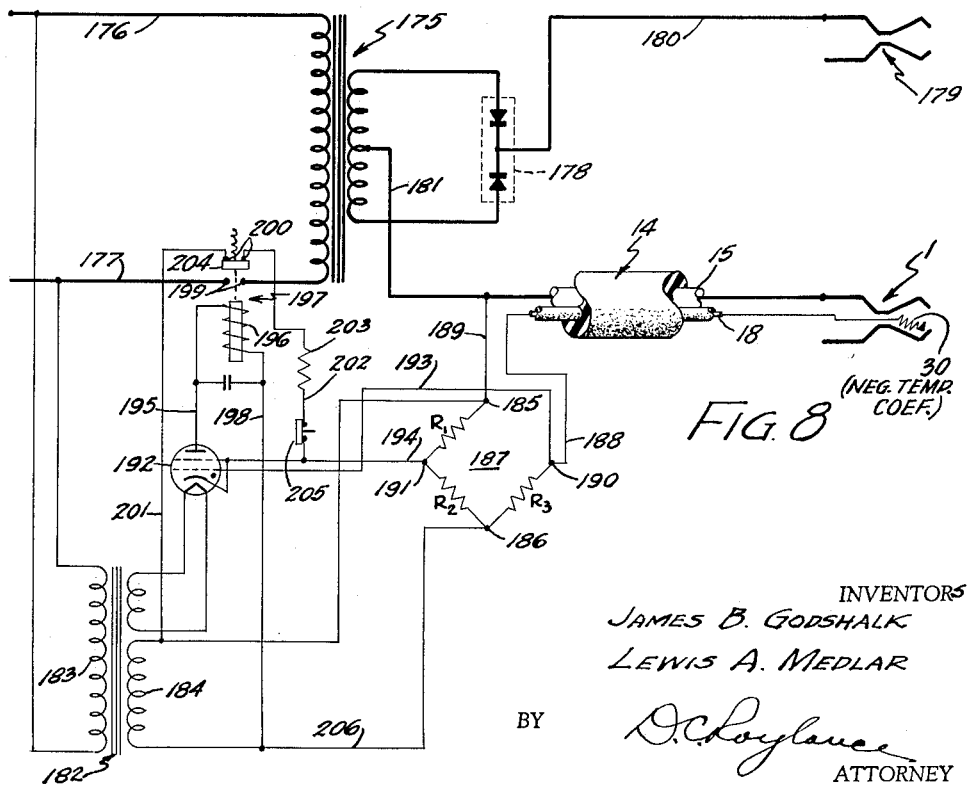

Fig. 8 illustrates a battery charger constructed in accordance with another embodiment of the invention and utilizing the connector clamp hereinbefore discussed with reference to Figs. 1–3. In this instance, the negative temperature coefficient resistance 30 carried by clamp 1 is employed in a control circuit constructed and arranged to de-energize the charger when the battery being charged reaches a predetermined temperature.

The charging circuit includes a transformer 175 the primary winding of which is connected to a source of alternating current (not shown) via supply conductors 176 and 177. A center tap rectifier 178 is connected across the primary winding of transformer 175, the center tap of rectifier 178 being connected to a connector clamp 179 via conductor 180. The secondary winding of transformer 175 is center tapped and the center tap is connected, via conductor 181, and main conductor 15 of cable 14, to connector clamp 1.

A transformer 182 has its primary winding 183 connected between A.C. supply conductors 176 and 177, as shown. Secondary winding 184 of transformer 182 is connected to the input points 185 and 186 of a Wheatstone bridge 187. Bridge 187 includes standard, or ratio, resistance arms $R^1$ and $R^2$ and a variable arm including negative temperature coefficient resistance 30, which resistance is connected into the bridge via conductors 188, 18 and 189, the latter being connected between bridge input point 185 and connector clamp 1. It will thus be seen that the variable arm of the bridge is completed only when connector clamp 1 is attached to the terminal post of a battery to be charged. The bridge 187 is completed by a resistance arm $R^3$ balancing the variable arm.

Output terminals 190 and 191 of bridge 187 are connected respectively to the control grid and cathode of a Thyratron or equivalent thermionic tube 192 by conductors 193 and 194. The plate of tube 192 is connected by conductor 195 to one terminal of actuating winding 196 of a relay 197, the other terminal of winding 196 being connected via conductor 198 to bridge input conductor 206 and thus to input point 186 of bridge 187.

Relay 197 includes fixed contacts 199 interposed in A.C. supply conductor 177, and also includes fixed contacts 200 interposed in an unbalancing circuit comprising conductors 201 and 202 arranged as shown to connect resistance 203 in parallel with the variable arm of bridge 187 when contacts 200 are bridged. Relay 197 is completed by a movable contact 204 which is spring biased into bridging engagement with fixed contacts 200 and which is actuated into engagement with fixed contacts 199, opening contacts 200, when winding 197 is energized. Thus, relay 197 normally interrupts the charging circuit and normally completes the bridge unbalancing circuit. A push button switch 205 is interposed in conductor 202 to allow the unbalancing circuit to be momentarily interrupted for starting a charging operation.

Operation of the charger illustrated in Fig. 8 is broadly the same as described in U.S. Patent 2,499,663, issued March 7, 1950, to L. A. Medlar, and U.S. Patent 2,529,038, issued November 7, 1950, to L. A. Medlar et al. When the temperature of the battery, as sensed by thermally responsive impedance 30, is below a predetermined value selected as the cutoff temperature, as is the case when the charger is connected to a normally cool battery to be charged, bridge 187 is unbalanced in a sense causing a bridge output voltage in phase with the plate voltage of tube 192. This in-phase relationship of the bridge output voltage and the plate voltage causes the tube 192 to be conductive. Hence, winding 196 is energized and relay 197 is actuated to complete the A.C. input circuit and allow charging.

As the internal temperature of the battery increases during charging, the value of resistance 30 decreases and the bridge 187 approaches a balanced condition. Upon balancing of the bridge, the grid voltage of tube 192 becomes zero, since there is no potential difference between bridge output terminals 190 and 191. Hence, as the bridge swings through the balance point as a result of the changing value of resistance 30, tube 192 becomes nonconductive, de-energizing winding 196 and allowing movable contact 204 of the relay to return to its normal position bridging contacts 200. De-energization of the relay interrupts the charging circuit, so terminating charging, and, in completing the unbalancing circuit including resistance 203, decisively unbalances the bridge in a sense to cause tube 192 to remain nonconductive, assuring that charging will not again commence until the charger is connected to a battery having a temperature below the cutoff point, opening of push button switch 205 of course being necessary to allow activation of the charger for another cycle of operation.

Fig. 9 illustrates the invention as applied to a storage battery tester of the general type described and claimed in copending application Serial No. 19,573, filed April 4, 1960, by Louis N. Strain. This type of tester can be generally characterized as comprising a single meter or indicating circuit combined with additional features allowing the same to be used either to determine the terminal voltage of the battery or to compare the conditions of the individual cells of the battery by measuring the conductivity of the battery cell electrolyte. A voltmeter 210, advantageously of the suppressed zero type disclosed in U.S. Patent 2,817,816, issued December 24, 1951, to Lewis A. Medlar, is employed in combination with bridge-connected rectifiers 211—214, the input terminals of the rectifier bridge being connected to the battery to be tested and the voltmeter 210 being connectible across the galvanometer points of the rectifier bridge via circuit means including a first two-position switch 215, arranged between the meter and one galvanometer point of the bridge, a second such switch 216, a selector switch 217 and one or the other of parallel resistance branches 218, 219, depending upon the position of selector switch 217. Switches 215 and 216 are ganged for simultaneous operation.

The load circuit for discharging the battery under test includes a first discharge resistor 220 connected across the terminals of battery B via conductors 221 and 15 and connector clamps 222 and 1. A relay 223 has its normally-open contacts 224 connected in conductor 221 in series with resistor 220, the actuating winding 225 of relay 223 being connected between conductors 221 and 15 via the normally-open contacts 226 of a time switch indicated generally at 227. A second discharge resistor 228 is connected in parallel with resistor 220 via the normally-open contacts 229 of a relay 230, the actuating winding 231 of relay 230 being connected across resistor 220 via the normally-closed contacts 232 of a relay 233. Actuating winding 234 of relay 233 is connected between conductors 221 and 15, as shown, so as to receive current whenever the clamps 222 and 1 are attached to the terminals of a battery B to be tested. Relay 233 is designed to be actuated only by voltages above a predetermined value.

The tester illustrated in Fig. 9 is intended for use with batteries having either of two different voltage ratings, for example, with 6-voltage and 12-voltage batteries.

When a 6-volt battery is to be tested, both discharge resistors 220 and 228 are employed in parallel. When a 12-volt battery is to be tested, only discharge resistor 220 is included in the circuit.

Resistance branches 218 and 219 present different resistance values chosen for proper operation of meter 210 with 6-volt and 12-volt batteries, respectively. For simplicity of operation, selector switch 217 can take the form of an additional contact set in relay 233, so that relay 233 serves automatically to select both the proper discharge resistor and the proper one of resistance branches 218, 219 in response to the voltage battery B.

Connector clamp 1 is constructed precisely as hereinbefore described with reference to Figs. 1–3 and additionally comprises, as part of cable 14, a second auxiliary conductor 235 electrically connected in any suitable fashion directly to the block 23 which carries thermally responsive resistance 30.

The input points of the rectifier bridge are connected respectively to clamps 222 and 1 via conductors 238 and 235. Conductor 238 has interposed therein a fixed resistance 239.

Thermally responsive resistance 30, in this case a negative temperature coefficient resistance, is effectively connected in parallel with the voltmeter circuit to compensate the same in accordance with the temperature of the battery B during discharge thereof to accomplish a load test. This parallel connection is established via conductor 18, one fixed contact of a two-position switch 240 and conductor 241, as shown. A fixed resistance 242 is connected between conductor 235 and the remaining fixed contact of switch 240, so that switch 240 can be actuated to select resistance 242 and exclude resistance 30 in order to render the meter circuit independent of battery temperature when it is desired to employ the same for open circuit testing rather than load testing.

It will thus be seen that the circuit described allows negative temperature coefficient resistance 30 to be connected in parallel with the meter circuit whenever the battery B is discharged through one or both of the discharge resistors 220, 228 during testing. This embodiment of the invention thus provides for compensation of the meter circuit in view of the fact that the battery voltage under load varies directly as the temperature of the battery. In other words, if load testing is carried out without the use of compensating resistance 30, there is a tendency for too high a reading for unusually warm batteries and too low a reading for unusually cold batteries.

The apparatus illustrated in Fig. 9 operates to provide an open circuit terminal voltage reading when employed with the contacts 226 of time switch 227 in open position, in which case switch 240 is positioned to include resistance 242 and exclude the thermally responsive resistance 30. It will be understood that, since the battery B is not discharged during this type of testing, there is no need for compensating the meter circuit for the effect of the temperature of the battery.

The apparatus of Fig. 9 is additionally useful to compare the individual cells of the battery by measuring the conductivity of the electrolyte thereof. For this purpose, one fixed contact of switch 215 is connected to the positive terminal of a source 243 of direct current, the negative terminal of source 243 being connected via conductor 244 to one electrode of a conductivity probe unit indicated generally at 245 and constructed in accordance with the aforementioned copending application Serial No. 19,573. One fixed contact of switch 216 is connected via adjusting rheostat 246 and conductor 247 to the other electrode of probe unit 245. The operation of the apparatus to compare cell voltages by measuring conductivity of the cell electrolytes is described in aforementioned copending application Serial No. 19,573.

While particularly advantageous embodiments of the invention have been chosen for illustrative purposes, it will be understood that various changes and modifications can be made therein without departing from the scope of the invention as defined in the appended claims.

What is claimed is:

1. In a connector for a storage battery servicing apparatus, the combination of a metal connector body structure dimensioned and arranged for attachment to a terminal post of the battery to be serviced; a highly heat conductive metal member mounted on and thermally insulated from said body structure and so disposed as to engage a battery terminal post when said connector body structure is attached thereto; a thermally responsive impedance carried by said metal member and disposed in good heat transfer relation therewith, means including a first conductor connected electrically to said body structure for connecting the connector to the battery servicing apparatus and for establishing heavy current flow through at least a portion of said body structure during servicing of the battery, said metal member being electrically isolated from that portion of said body structure carrying such heavy current flow; and means including a second conductor connected to said impedance for connecting the same to the battery servicing apparatus.

2. In a connector for an apparatus for charging storage batteries, the combination of two metal clamp members, one of said clamp members having a jaw portion dimentioned for engagement with a battery terminal post, said clamp members being movably interconnected and the other of said clamp members having a jaw portion generally opposed to the jaw portion of said one clamp member; means comprising a first electrical conductor connected to said one clamp member for connecting the connector to the charging apparatus for the supply of charging current via said one clamp member; a highly heat-conductive metal member mounted on the jaw portion of said other clamp member and facing the jaw portion of said one clamp member, said highly heat-conductive metal member being thermally insulated from said other clamp member and electrically insulated from said one clamp member; a thermally responsive impedance carried by said highly heat-conductive member and disposed in good heat transfer relation therewith, said impedance having one terminal connected electrically to said highly heat-conductive member; means biasing said clamp members to move the jaw portion of said one clamp member and said highly heat-conducting member into direct clamping engagement with the battery terminal post; and means including a second electrical conductor connected to the other terminal of said impedance for connecting said impedance to the charging apparatus via a circuit including the series combination of said impedance, said highly heat-conductive member and the battery terminal post to which the connector is attached.

3. A connector in accordance with claim 2 and wherein the jaw portion of said other clamp member is of generally U-shaped transverse cross section, said highly heat-conductive member is disposed between the side walls of said jaw portion of said other clamp member and projects beyond said side walls toward the jaw portion of said one clamp member, and a portion of said highly heat-conductive member facing the jaw portion of said one clamp member is provided with projections adapted to engage the battery terminal post.

4. In a battery charging apparatus, the combination of a charging circuit including two connectors for attachment respectively to the terminal posts of the battery to be charged, and a control circuit operatively associated with said charging circuit and including a thermally variable impedance for responding to the temperature of the battery being charged, one of said connectors including a metal body structure via which charging current flows, and a highly heat-conductive metal member mounted on and thermally and electrically insulated from said body structure and so disposed as to engage the battery terminal post to which said one connector is attached, said impedance being carried by said metal member in good heat transfer relation therewith and having one of its terminals connected electrically thereto, said control circuit including a circuit portion connected to be completed via the series combination of said impedance, said metal member and the battery terminal post to which said one connector is attached.

References Cited in the file of this patent

UNITED STATES PATENTS

| | | |
|---|---|---|
| 1,695,295 | Rollins | Dec. 18, 1928 |
| 1,860,999 | Ellis | May 31, 1932 |
| 2,442,445 | Toelle | June 1, 1948 |
| 2,454,487 | Storck | Nov. 23, 1948 |
| 2,529,038 | Medlar et al. | Nov. 7, 1950 |